(12) United States Patent
Vaish et al.

(10) Patent No.: US 9,959,138 B1
(45) Date of Patent: May 1, 2018

(54) ADAPTIVE SELF-MAINTENANCE SCHEDULER

(71) Applicant: Cohesity, Inc., Santa Clara, CA (US)

(72) Inventors: Tarang Vaish, Santa Clara, CA (US); Anirvan Duttagupta, Santa Clara, CA (US); Sashi Madduri, Mountain View, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days. days.

(21) Appl. No.: 14/852,249

(22) Filed: Sep. 11, 2015

(51) Int. Cl.
*G06F 9/46* (2006.01)
*G06F 15/173* (2006.01)
*G06F 9/48* (2006.01)
*G06F 9/50* (2006.01)
*G06F 3/06* (2006.01)

(52) U.S. Cl.
CPC .............. *G06F 9/48* (2013.01); *G06F 3/067* (2013.01); *G06F 3/0613* (2013.01); *G06F 3/0643* (2013.01); *G06F 9/4843* (2013.01); *G06F 9/4881* (2013.01); *G06F 9/4887* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5033* (2013.01); *G06F 9/5038* (2013.01); *G06F 9/5044* (2013.01); *G06F 9/5055* (2013.01); *G06F 9/5094* (2013.01)

(58) Field of Classification Search
None
See application file for complete search history.

(56) References Cited

U.S. PATENT DOCUMENTS

| | | | | |
|---|---|---|---|---|
| 5,854,754 A | * | 12/1998 | Cabrera | G06F 9/5027 703/2 |
| 8,214,836 B1 | * | 7/2012 | Markov | G06F 9/4881 718/102 |
| 8,661,447 B1 | * | 2/2014 | Olliff | G06F 9/4887 718/102 |
| 8,959,509 B1 | * | 2/2015 | Sobel | G06F 9/4843 718/1 |
| 2006/0101400 A1 | * | 5/2006 | Capek | G06F 9/4843 717/120 |
| 2006/0190938 A1 | * | 8/2006 | Capek | G06F 9/46 717/161 |
| 2007/0011683 A1 | * | 1/2007 | Helander | G06F 9/4887 718/104 |
| 2009/0125577 A1 | * | 5/2009 | Kodama | G06F 11/1458 709/201 |
| 2009/0327495 A1 | * | 12/2009 | Betts-LaCroix | H04L 67/10 709/226 |

(Continued)

*Primary Examiner* — Charles M Swift
(74) *Attorney, Agent, or Firm* — Van Pelt, Yi & James LLP

(57) ABSTRACT

Embodiments presented herein disclose adaptive techniques for scheduling self-maintenance processes. A load predictor estimates, based on a current state of a distributed storage system, an amount of resources of the system required to perform each of a plurality of self-maintenance processes. A maintenance process scheduler estimates, based on one or more inputs, an amount of resources of the distributed system available to perform one or more of the self-maintenance processes during at least a first time period. The maintenance process scheduler determines a schedule for the one or more of the self-maintenance processes to perform during the first time period, based on the estimated amount of resources required and available.

18 Claims, 8 Drawing Sheets

(56) References Cited

U.S. PATENT DOCUMENTS

| | | | |
|---|---|---|---|
| 2010/0058349 A1* | 3/2010 | Diwakar | G06F 9/5044 718/104 |
| 2010/0185583 A1* | 7/2010 | Berinde | G06F 11/1461 707/610 |
| 2010/0205607 A1* | 8/2010 | Shivanna | G06F 9/4881 718/103 |
| 2010/0325634 A1* | 12/2010 | Ichikawa | G06F 9/4856 718/103 |
| 2011/0138055 A1* | 6/2011 | Daly | G06F 9/505 709/226 |
| 2012/0089650 A1* | 4/2012 | Gibbs | G06F 17/30073 707/822 |
| 2012/0198462 A1* | 8/2012 | Cham | G06F 9/5038 718/103 |
| 2013/0007741 A1* | 1/2013 | Britsch | G06F 9/4401 718/1 |
| 2013/0111470 A1* | 5/2013 | Bozek | G06F 9/4881 718/1 |
| 2014/0059228 A1* | 2/2014 | Parikh | G06F 9/5005 709/226 |
| 2014/0181294 A1* | 6/2014 | Deshpande | G06F 9/45533 709/224 |
| 2015/0019689 A1* | 1/2015 | Singh | H04L 67/06 709/219 |
| 2015/0127812 A1* | 5/2015 | Cheng | G06F 9/466 709/224 |
| 2015/0160972 A1* | 6/2015 | Yu | G06F 9/4856 718/1 |
| 2015/0277970 A1* | 10/2015 | Baz | G06F 9/4887 718/102 |
| 2016/0004567 A1* | 1/2016 | Michel | G06F 9/505 718/104 |

\* cited by examiner

ADAPTIVE SELF-MAINTENANCE SCHEDULER

BACKGROUND

Field

Embodiments presented herein generally relate to self-maintenance background processes executing in a distributed file system, and more specifically, to adaptive techniques for scheduling such background processes.

Description of the Related Art

Distributed file systems often rely on background processes that update and correct inconsistencies on the file system. For example, a file system may use journaling to write data to disk. In such an approach, the file system initially writes the data into a journal to achieve relatively fast write I/O. And a maintenance process executes in the background to ensure that the data is eventually written to disk, e.g., by flushing the data in the journal to disk and updating pointers to the data. As another example, the file system may handle delete operations on stored data by removing pointers to the data. Although other blocks of data no longer reference the data (and the blocks in which the data was stored are indicated as free), the data remains stored on disk. A background process may later perform garbage collection to actually remove the data from the blocks so that the file system may use the blocks to store new data. A distributed file system may constantly employ a number of self-maintenance background processes to ensure that the file system remains consistent.

However, many self-maintenance processes are resource intensive. For example, some processes involve large data I/O, memory, and execution time (e.g., due to scanning the entire file system, performing large I/O operations, etc.). Although the processes execute in the background, the processes may nevertheless affect performance of foreground processes that generally take greater precedence, such as user-initiated file system activities. As a result, system administrators aim to schedule self-maintenance processes to execute during periods where minimally interfere with such foreground processes. For instance, an administrator may schedule a self-maintenance process relative to time, e.g., schedule a garbage collection process to execute at a specified time. An administrator may also specify that a process be executed in response to a given event, e.g., if a user deletes a file exceeding a given amount of disk space. And an administrator may also schedule a process to occur in response to a system state, e.g., if an amount of free disk space is below a specified threshold.

SUMMARY

One embodiment presented herein generally describes a method. The method generally includes estimating, based on a current state of a distributed storage system, an amount of resources of the distributed storage system required to perform each of a plurality of self-maintenance processes. The method also includes estimating, based on one or more inputs, an amount of resources of the distributed storage system available to perform one or more of the plurality of self-maintenance processes during at least a first time period of a plurality of time periods. Based on the estimated amount of resources required and on the estimated amount of resources available, the one or more of the self-maintenance processes is scheduled to perform during the first time period.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
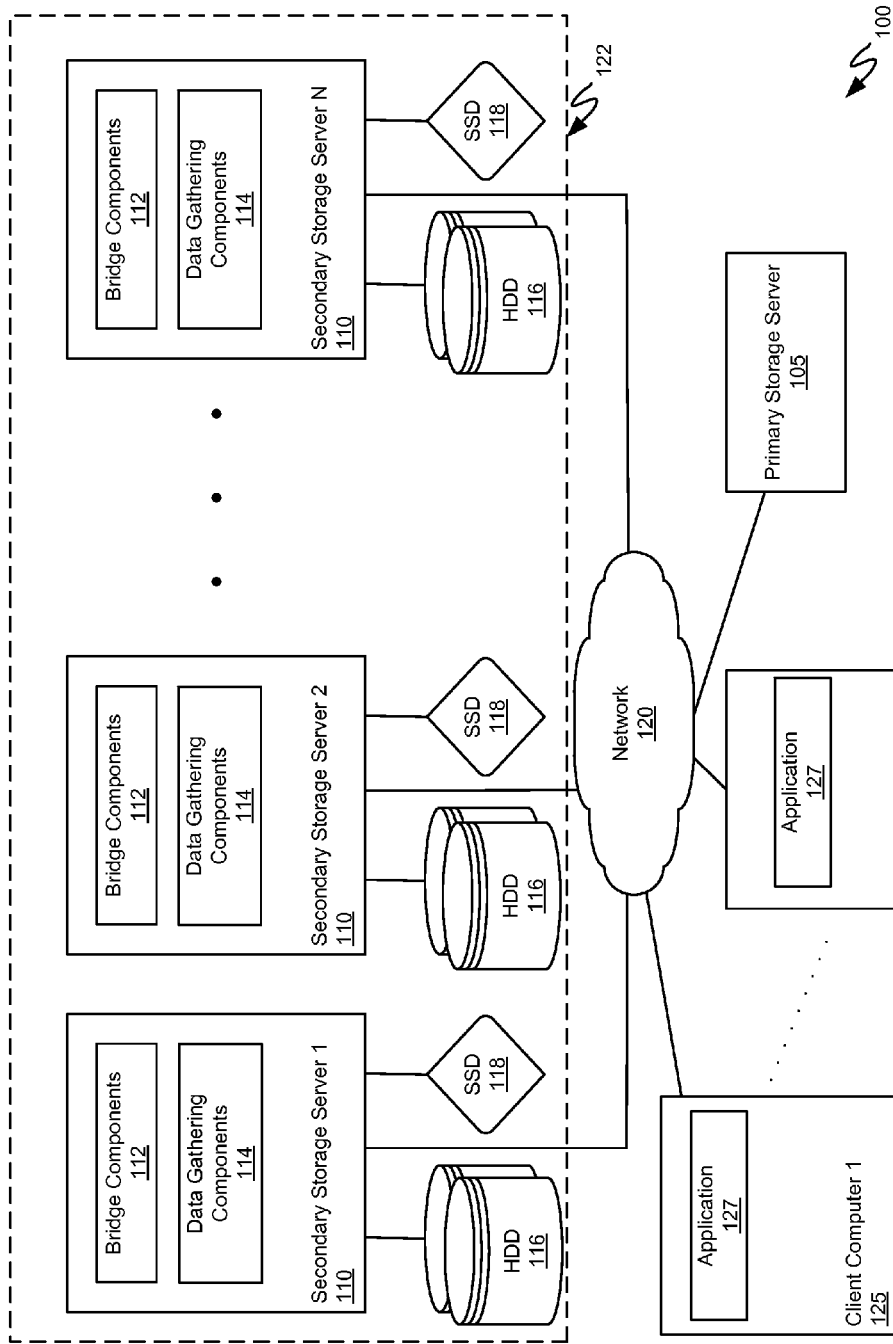
FIG. 1 illustrates an example computing environment, according to one embodiment.

Embodiments presented herein describe techniques for adaptively scheduling self-maintenance processes in a distributed file system. Current approaches to scheduling self-maintenance processes are typically based on one (or a combination) of time, event, or file system state. For instance, a system administrator may configure a file system such that garbage collection processes execute during a specified time of day where other file system activity is at a known relative minimum. However, such an approach is rigid and often does not account for unexpected occasions where system activity is high during that scheduled period. In response to such activity, the administrator can manually reschedule the process to occur at a later point in time. But doing so may result in suboptimal performance of the entire distributed file system due to an accumulation of work left outstanding.

To address such issues, the techniques disclosed herein provide a mechanism for scheduling self-maintenance processes based on constantly observed inputs. For example, assume the techniques may apply to a distributed secondary storage system that has a set of self-maintenance processes to perform on a routine basis. In one embodiment, the secondary storage system includes a load predictor. The load predictor receives published current file system state information as input. Further, the load predictor estimates a resource load required by each self-maintenance process. To do so, the load predictor may evaluate the state information relative to resource requirements of each self-maintenance process.

In addition, the secondary storage system includes a maintenance process scheduler. In one embodiment, the maintenance process scheduler recommends one or more of the self-maintenance processes to initalize at a given point of time. To do so, the maintenance process scheduler receives a variety of inputs. For instance, the maintenance process scheduler receives the estimated resource load from the load predictor. Further, the maintenance process scheduler also receives current system activities (e.g., user-initiated activities on the secondary storage server, read and write I/O, etc.), currently scheduled activities (e.g., backup processes, routine replication and archiving, etc.), historical activities (e.g., processes that were performed on a given day X years ago, X weeks ago, etc.), and external events (e.g., known activities occurring on a primary storage server). The maintenance process scheduler may estimate resource availabilities at specified time periods. Doing so allows the maintenance process scheduler to determine, based on predictive methods and the received parameters as inputs, which of the self-maintenance processes to execute at a given time period.

For example, assume based on historical events that the maintenance process scheduler determines that primary storage workloads are relatively high on the eve of national holidays. In such a case, the maintenance process scheduler may recommend executing self-maintenance processes that require a smaller resource load (as determined by the load predictor) during that period. Also, assume based on historical events that the maintenance process scheduler determines that primary storage workloads are relatively low every evening in a given period, and also assume that no other secondary storage system activities are scheduled for that period. In this case, the maintenance process scheduler may recommend executing self-maintenance processes that require a high resource load (as determined by the load predictor) during that period.

Further, the maintenance process scheduler can adjust schedules of self-maintenance processes in response to unexpected events. Continuing the previous example of executing resource-intensive self-maintenance processes during downtime periods, assume the maintenance process scheduler currently observes a spike in resource usage in one or more primary storage workloads. The maintenance process scheduler may evaluate the resource spike to determine whether the resource usage might continue at such a level. If so, the maintenance process scheduler may schedule the self-maintenance process for a more suitable period.

In one embodiment, the load predictor and maintenance process scheduler receive runtime statistics for each executed self-maintenance process. The load predictor and maintenance process scheduler may continuously adjust input parameters based on the runtime statistics. For instance, the load predictor may compare actual resource load caused by a given self-maintenance process with the predicted resource load for that process. The load predictor may then reinforce or reconfigure input parameters based on the comparison. Doing so ensures a more accurate load prediction for subsequent scheduling. As another example, the maintenance process scheduler may compare actual resource availability to predicted availability. The maintenance process scheduler may then reinforce or reconfigure input parameters based on the comparison to ensure a more accurate resource availability for subsequent scheduling.

Advantageously, embodiments presented herein provide an adaptive approach to scheduling self-maintenance processes in a distributed file system. Rather than configure the distributed file system to adhere to a specified schedule for each process, the distributed file system may dynamically determine optimal times to schedule self-maintenance processes based on a variety of observed factors (e.g., current system activities, scheduled system activities, external activities, and the like). In addition, because the load predictor and scheduler include self-learning mechanisms, the secondary storage system may further optimize scheduling based on statistics of previously executed self-maintenance processes.

Note, the following description uses a distributed secondary storage system as a reference example of a file system that schedules background self-maintenance processes to execute based on constantly observed input parameters. However, one of ordinary skill in the art will recognize that embodiments may be adapted to a variety of distributed storage systems that perform self-maintenance background processes (e.g., garbage collection, updating free blocks, updating internal statistics, performing compaction methods, cloud spill optimization, remote replication, and the like) to preserve consistency of a file system.

FIG. 1 illustrates an example computing environment 100, according to one embodiment. As shown, the computing environment 100 includes a primary storage server 105, a cluster 122, and client computers 125. As shown, the cluster 122 includes multiple computing servers 110 that host and manage a distributed service (e.g., secondary storage services). The primary storage server 105 and secondary storage servers 110 (depicted as secondary storage servers 1-N 110) are each connected via a network 120. The primary storage server 105 and secondary storage servers 110 may provide storage for a data center.

In particular, the cluster 122 of secondary storage servers 110 form a distributed file system which provides backup storage and services to the primary storage server 105. Illustratively, each secondary storage server 110 (or "node") of the distributed file system includes bridge components 112 and data gathering components 114. The bridge components 112 may provide software applications that allow external clients to access each node. The data gathering components 114 are generally configured to retrieve data from primary storage server 105 (e.g., by communicating with the primary storage server 105 using a backup protocol). Further, each node includes one or more hard disk drives (HDDs) 116 and solid-state drives (SSDs) 118 for storing data from primary storage server 105. The SSDs 118 increase the performance running secondary storage transactions, such as serial-write transactions. In one embodiment, the distributed file system is the SnapFS® developed by Cohesity, Inc.

In one embodiment, distributed cluster 122 may expose backup data to applications 127 on client computers 125 (depicted as client computers 1-M 125). For example, assume the distributed cluster 122 provides a backup of a file system on the primary storage server 105. In such a case, the cluster 122 could create a snapshot of a file system on the primary storage server 105 every few minutes. Further, the cluster 122 could expose a clone of one of the snapshots to applications 127. For example, the cluster 122 could export a clone as an NFS mount point (or SMB, CIFS, etc.), allowing the clients 125 to mount the snapshot over a directory in the local file system of the client 125. In such a case, the bridge components 112 may respond to requests from clients 125 to perform NFS operations (or operations for SMB, CIFS, etc.) on the mounted directory (e.g., lookup, create, read, write, rename, remove, etc.).

Figure 2:
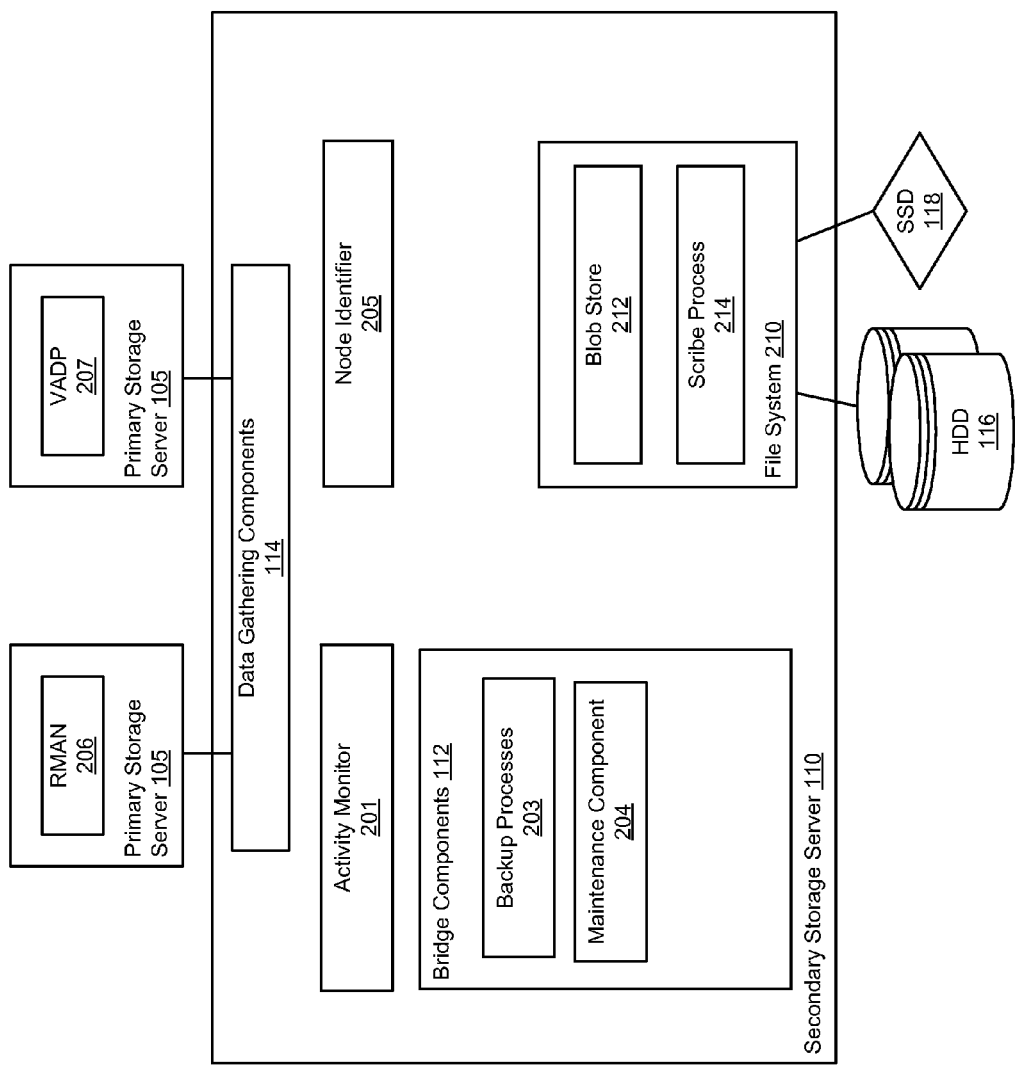
FIG. 2 further illustrates an example of one of the secondary storage servers described relative to FIG. 1, according to one embodiment.

FIG. 2 further illustrates an example of one of the secondary storage servers 110, according to one embodiment. As shown, the secondary storage server 110 includes bridge components 112, data gathering components 114, an activity monitor 201, a node identifier 205. The node identifier 205 is a distinct value that may be based on the MAC address of the secondary storage server 110. The bridge component 112 further includes one or more backup processes 203 and a maintenance component 204.

As stated, the data gathering components 114 communicate with primary storage servers in the computing environment 100. Illustratively, the data gathering components 114 may retrieve data from primary storage servers 201 and 202, where each primary storage server 201 and 202 execute backup protocols such as recovery manager (RMAN) 206 and vStorage APIs for Data Protection (VADP) 207.

The secondary storage server 110 includes a file system 210. The file system 210, in conjunction with the file systems of other secondary storage servers in the cluster, forms a distributed system used to store backup data from the primary storage services. Further, the secondary storage system may create each backup with its own format according to a backup object. For example, assume the bridge components 112 receive a virtual machine disk (VMDK) from the data gathering components 114. In such a case, backup processes 203 executing in the bridge components 112 write the VMDK to disk storage. In addition, file system metadata is stored in SSD 118. However, as a VMDK file can be quite large (e.g., terabytes), bridge components 112 may store the VMDK file as set of smaller blobs (binary large object) files managed by a blob manager, each having a set of chunks (e.g., approximately 8 KB each). Backup data below a given size threshold (e.g., files less than 256K bytes) could be stored in the SSD 118 directly along with the file system metadata. Each blob is encoded according to a backup format of the secondary storage system.

Data in the secondary storage server 110 may be stored in distributed B+ trees or blob structures. In one embodiment, data smaller than 256 KB resides in distributed B+ trees, and data larger than 256 KB is stored in blob structures. The secondary storage server 200 may maintain a blob store 214 that contains the blob structures. Each blob may be divided into regions of a particular size, such as 1 MB. These regions, or "bricks," may further contain chunks of data that reference logical files in the SSD 118 and the HDDs 116.

In one embodiment, the scribe process 214 also maintains information about the chunks of data in the blob store 212 in key-value stores (e.g., tree structures). One example key-value store may map blob structures to brick sections. Another store may map bricks to chunks. Yet another store may map chunks to logical files storage drives of the secondary storage server 110.

In one embodiment, the activity monitor 201 observes current activities and resource loads of the secondary storage server 110 as well as current activity and resource loads of sources such as the primary storage servers 105. For example, the activity monitor 201 may log network activity between the secondary storage server 110 and a given primary storage server 105. In addition, the activity monitor 201 may log resource loads (e.g., CPU resources, I/O, etc.) of source applications in a primary storage server 105, e.g., database applications, web server applications, and the like. To do so, the activity monitor 201 can call application programming interfaces (API) of the respective primary storage server 105. In addition, the activity monitor 201 constantly observes the state of the storage system 210. Although FIG. 2 depicts the activity monitor 201 as being separate from the data gathering components 114, it is possible to integrate the activity monitor 201 as part of the data gathering components 114.

In one embodiment, the bridge components 112 and data gathering components 114 may query the activity monitor 201 to determine activities and current resource loads of the secondary storage server 110. For instance, in one embodiment, the maintenance component 204 may use such information to determine when to schedule self-maintenance processes within the secondary storage server 105.

Figure 3:
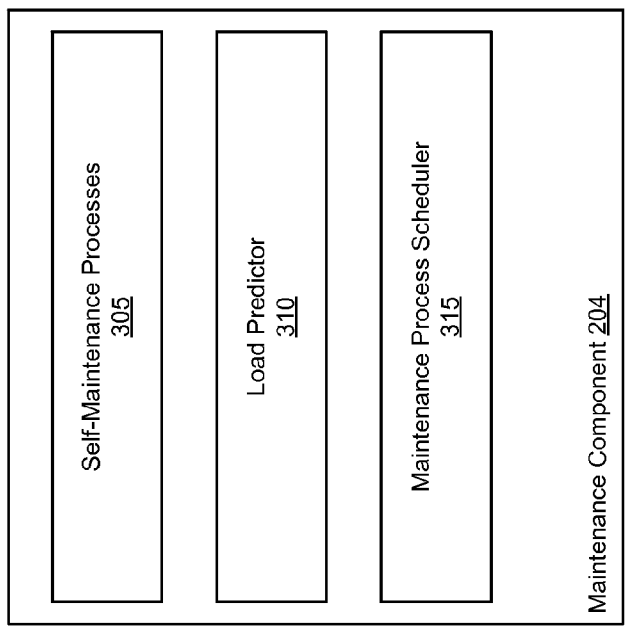
FIG. 3 further illustrates the maintenance component described relative to FIG. 2, according to one embodiment.

FIG. 3 further illustrates the maintenance component 204, according to one embodiment. As shown, the maintenance component 204 further includes one or more self-maintenance processes 305, a load predictor 310, and a maintenance process scheduler 315.

In one embodiment, each of the self-maintenance processes 305 perform some function towards ensuring that the distributed storage system 210 remains consistent during operation of the secondary storage server 110. As stated, the secondary storage server 110 performs numerous functions. For instance, the secondary storage server 110 performs backup processes 203 to write backup data into the storage system 210. Such backup processes 203 can involve various read/write I/O operations and organization of data. In addition, a user may perform operations on the data (e.g., via the application 127), such as delete and move operations. In such operations, pointers often need to be updated such that the pointers reference correct blocks of storage. Further, the secondary storage server 110 often needs to update internal statistics, e.g., by scanning the entire storage system 210 and evaluating the scanned data to determine what has been changed. The self-maintenance processes 305 perform in the background to address the aforementioned issues. Other examples of self-maintenance processes 305 in the secondary storage server 110 include, but are not limited to, garbage collection, updating free blocks of data, rebalancing stored data (e.g., as secondary storage server 110 nodes are added or removed from the cluster), replication across secondary storage server 110 nodes for fault tolerance, cloud spilling data, and the like. However, because some self-maintenance processes 305 are compute-intensive, scheduling such processes presents a challenge due to other processes in the secondary storage server 110 that also require resources for performing tasks.

In one embodiment, the load predictor 310 estimates a required resource load for each of the self-maintenance processes based on a current file system state of the secondary storage server 110. To do so, the load predictor 310 may obtain a current state of the storage system 210 from the activity monitor 201. The load predictor 310 may then evaluate the state of the storage system 210. The storage system 210 state indicates how much work is required to be performed by the self-maintenance processes 305, e.g., how much garbage collection needs to be performed on the storage system 210, what free blocks in the storage system 210 need to be updated, which blocks need to be compressed, etc. Thus, the load predictor 310 can estimate an amount of resources (e.g., I/O, network resources, processing, etc.) that a self-maintenance process 305 may require. In one embodiment, the load predictor 310 may use predictive methods (e.g., machine learning techniques) using the storage system 210 state information as an input parameter.

In one embodiment, the maintenance process scheduler 315 estimates resource availability on the secondary storage system 110 for a given period of time. Further, the maintenance process scheduler 315 makes such estimations based on a variety of inputs, such as the estimated resource load determined by the load predictor 310 as well as the current file system state information and the current system activities observed by the activity monitor 201. Another example of one of the inputs includes external events scheduled to occur in sources, e.g., virtual machines, database servers, web servers, etc., that produce data backed up by the secondary storage server 110. The secondary storage server 110 retrieves external event information from the respective source.

Yet another example of one of the inputs includes historical activities stored by the secondary storage server 110. Historical activities indicate resource trends based on previous activities on the secondary storage server 110. For example, the secondary storage server 110 can determine, based on the historical activities, time periods where system resource loads have been observed to be high (e.g., weekdays between 9:00 AM to 12:00 PM and 1:00 PM to 4:00 PM) and have been low (e.g., on Thanksgiving and Christmas holidays). The various inputs to the maintenance process scheduler 315 allow it to estimate (e.g., via predictive methods) resource availability during periods of time.

Further, the maintenance process scheduler 315 can determine, based on the estimation, when to schedule each of the self-maintenance processes 305. For example, the maintenance process scheduler 315 may schedule a self-maintenance process 305 that requires a large amount of I/O resources (as determined by the load predictor 310) to execute during a period where current system activity is low, and where no external activities are occurring. As another example, the maintenance process scheduler 315 may schedule a self-maintenance process 305 that requires a fewer resources during a period where the process 305 can execute without adversely affecting performance other activities (e.g., user-initiated operations, source workload operations, etc.).

In one embodiment, the maintenance component 204 executes the processes 305 according to the schedule set by the scheduler 315. Further, the maintenance component 204 may feedback statistics of the executed processes 305 to both the load predictor 310 and scheduler 315. Doing so allows the load predictor 310 and the scheduler 315 to tune parameters for more accurate resource load and availability estimations during operation of the secondary storage server 110.

Figure 4:
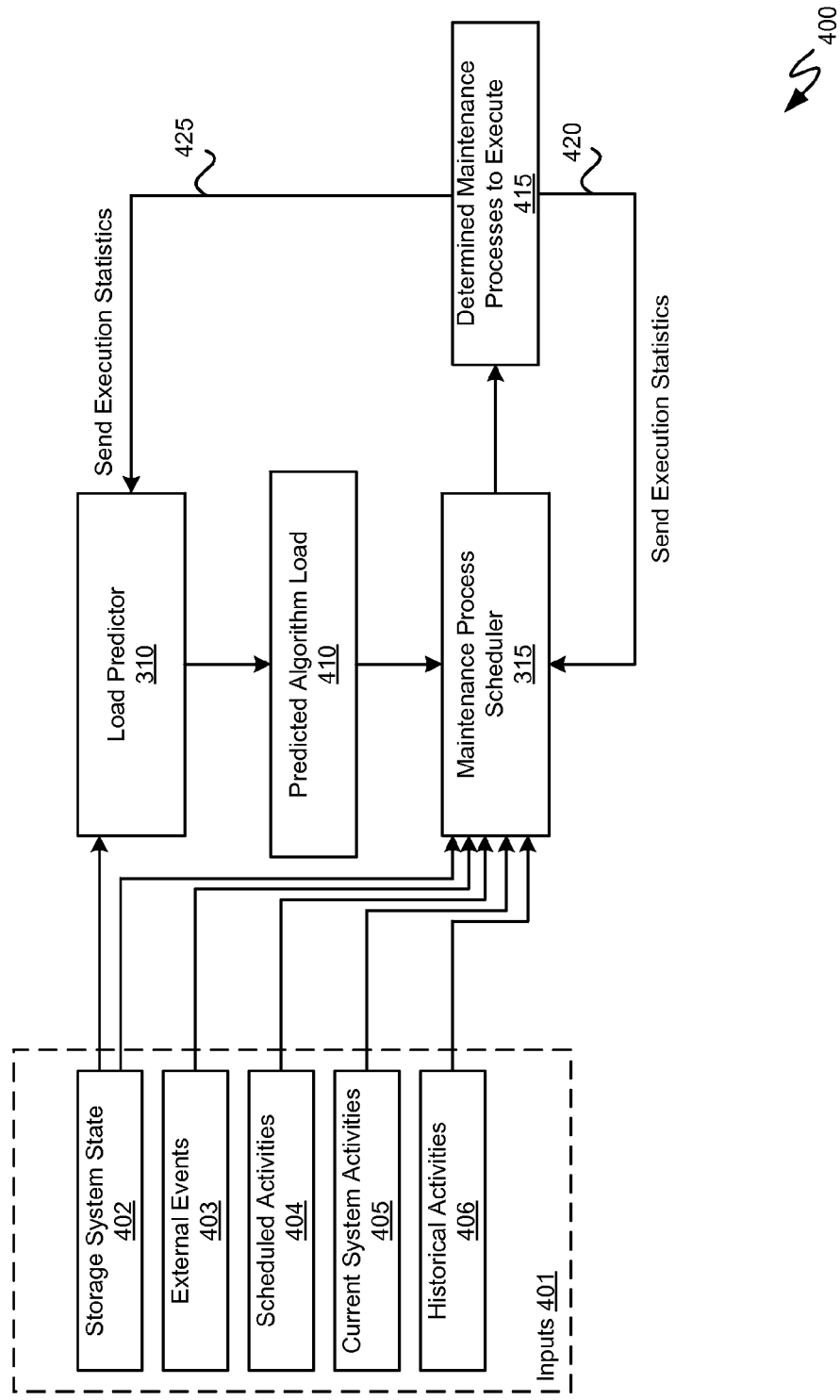
FIG. 4 illustrates an example flow of adaptively scheduling maintenance processes in a distributed file system, according to one embodiment.

FIG. 4 illustrates an example flow 400 of adaptively scheduling maintenance processes in a distributed file system, according to one embodiment. In particular, the flow 400 illustrates activity occurring between the load predictor 310 and the maintenance process scheduler 315.

As shown, FIG. 4 depicts various inputs 401. Such inputs 401 may include, but are not limited to, storage system state 402, external events 403, scheduled activities 404, current system activities 405, and historical activities 406. Each of the inputs 401 are described in detail above. The inputs 401 serve as parameters for the load predictor 310 and the maintenance process scheduler 315. For example, the load predictor 310 and the maintenance process scheduler both may retrieve the storage system state 402 from the activity monitor 201. The maintenance process scheduler 315 may also retrieve the external events 403, scheduled activities 404, current system activities 405, and historical activities 406.

In one embodiment, the load predictor 310 determines a predicted algorithm load 410, e.g., based on learning algorithms using the storage system state information and previously observed self-maintenance process execution statistics as input parameters. The predicted algorithm load 410 specifies an expected resource load (e.g., I/O, storage capacity, CPU resources, network resources, etc.) required by each of the self-maintenance processes 305. The load predictor 310 may send the predicted algorithm load 410 to the maintenance process scheduler 315.

In one embodiment, the maintenance process scheduler 315 estimates resource availability at specified time periods from the inputs 401, predicted algorithm load 410, and statistics from previous executions of one or more of the self-maintenance processes 305. The maintenance process scheduler 315 then determines, based on the estimated resource availability, which of the self-maintenance processes to execute (depicted as "determined maintenance processes to execute 415") at given time periods of operation of the secondary storage server 110. The maintenance component 204 may then execute the self-maintenance processes 305 at the time periods determined by the maintenance process scheduler 315.

As stated, the maintenance component 204 may feedback statistics of each executed self-maintenance process 205 to both the load predictor 310 and the maintenance process scheduler 315. Doing so provides allows the load predictor 310 to tune machine learning techniques and input 401 parameters for more accurate resource load predictions in subsequent iterations. Likewise, the statistics allow the maintenance process scheduler 315 to tune machine learning techniques and input 401 parameters for more accurate resource availability predictions in subsequent iterations.

Figure 5:
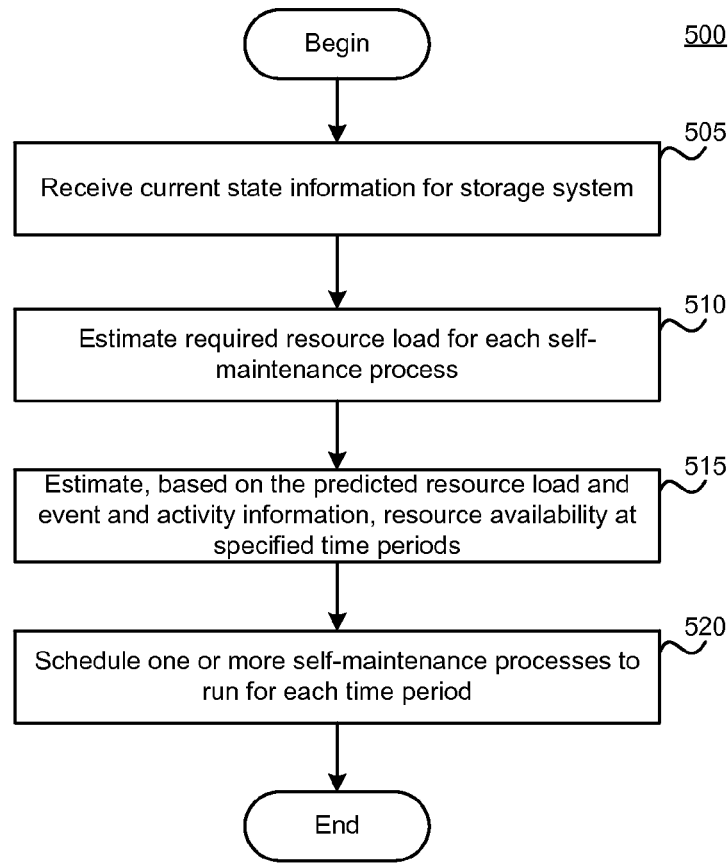
FIG. 5 illustrates a method for scheduling maintenance processes in a distributed file system, according to one embodiment.

FIG. 5 illustrates a method 500 for scheduling maintenance processes in a distributed file system, according to one embodiment. As shown, method 500 begins at step 505, where the load predictor 310 receives current state information for the storage system 210. For instance, the load predictor 310 may retrieve such information from the activity monitor 201. Such information may include, for example, blocks of the storage system 210 containing data that has been recently been modified or deleted (and thus may require pointer to the blocks). The load predictor 310 can determine a set of self-maintenance processes that need to be performed to maintain consistency in the secondary storage server 110.

At step 510, the load predictor 310 estimates a resource load required by each self-maintenance process for execution. The load predictor 310 does so based on the current storage system state information and statistics from previous executions of each self-maintenance process. The load predictor 310 may output the estimation to the maintenance process scheduler 315. In addition, the maintenance process scheduler 315 may receive various other inputs, such as current storage system state, external events, scheduled activities, current system activities, and historical activities.

At step 515, the maintenance process scheduler 315 estimates, based on the inputs, resource availability at specified time periods. The inputs allow the maintenance process scheduler 315 to predict which resources are available at periods such as every hour, every thirty minutes, every twelve hours, and the like. Doing allows the maintenance process scheduler 315, at step 520, to schedule one or more of the self-maintenance processes 305 in time periods where the resources are estimated to be available to accommodate the load (as estimated by the load predictor 310).

Figure 6:
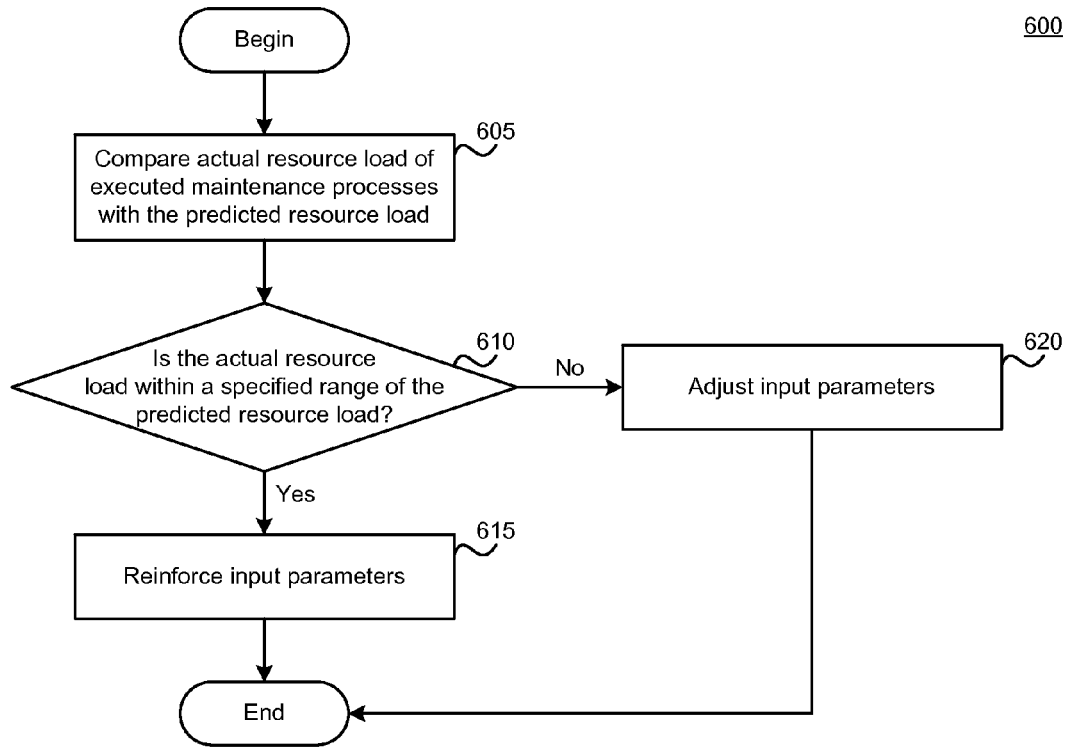
FIG. 6 illustrates a method for configuring a load predictor in response to maintenance process performance statistics, according to one embodiment.

FIG. 6 illustrates a method 600 for configuring the load predictor 310 in response to maintenance process performance statistics, according to one embodiment. As stated, the load predictor 310 is adaptive to system resources and can retune inputs to predictive algorithms based on statistics of self-maintenance process execution iterations. At step 605, the load predictor 310 compares an actual resource load (specified in the statistics) of a self-maintenance process 305 with the resource load previously predicted for that process 305.

At step 610, the load predictor 310 determines whether each part of the resource load (e.g., network resource load, processor load, I/O load, etc.) actually observed is within a specified range of the corresponding part of the predicted resource load. If so, then at step 615, the load predictor 310 uses machine learning algorithms to reinforce the input parameters used to estimate the resource load for that part. Otherwise, then at step 620, the load predictor 310 uses the machine learning algorithms to readjust the input parameters used to estimate the resource load.

Figure 7:
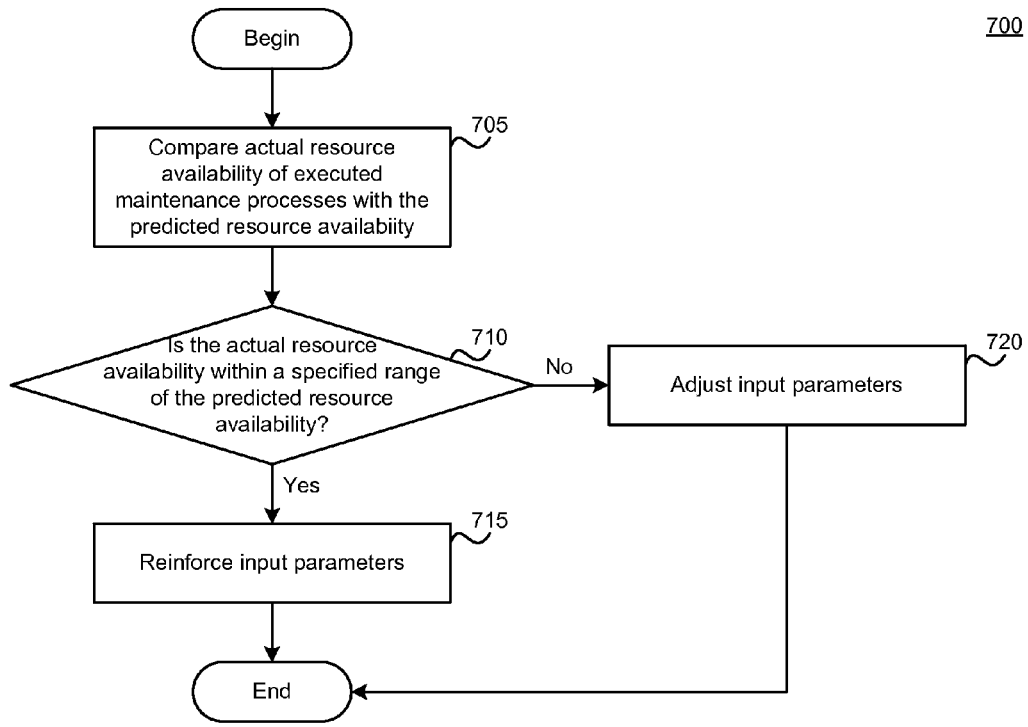
FIG. 7 illustrates a method for configuring a scheduler in response to maintenance process performance statistics, according to one embodiment.

FIG. 7 illustrates a method 700 for configuring a scheduler in response to maintenance process performance statistics, according to one embodiment. As stated, the maintenance process scheduler 315 is adaptive to system resources and can retune inputs to predictive algorithms based on statistics of self-maintenance process execution iterations. At step 705, the maintenance process scheduler 315 compares an actual resource availability (specified in the statistics) at a given time period with the resource availability previously predicted at that period.

At step 710, the maintenance process scheduler 315 determines whether each part of the resource availability (e.g., network resource availability, processor availability, I/O availability, etc.) actually observed is within a specified range of the corresponding part of the predicted resource availability. If so, then at step 715, the maintenance process scheduler 315 uses machine learning algorithms to reinforce the input parameters used to estimate the resource availability for that part. Otherwise, then at step 720, the maintenance process scheduler 315 uses the machine learning algorithms to readjust the input parameters used to estimate the resource availability.

Figure 8:
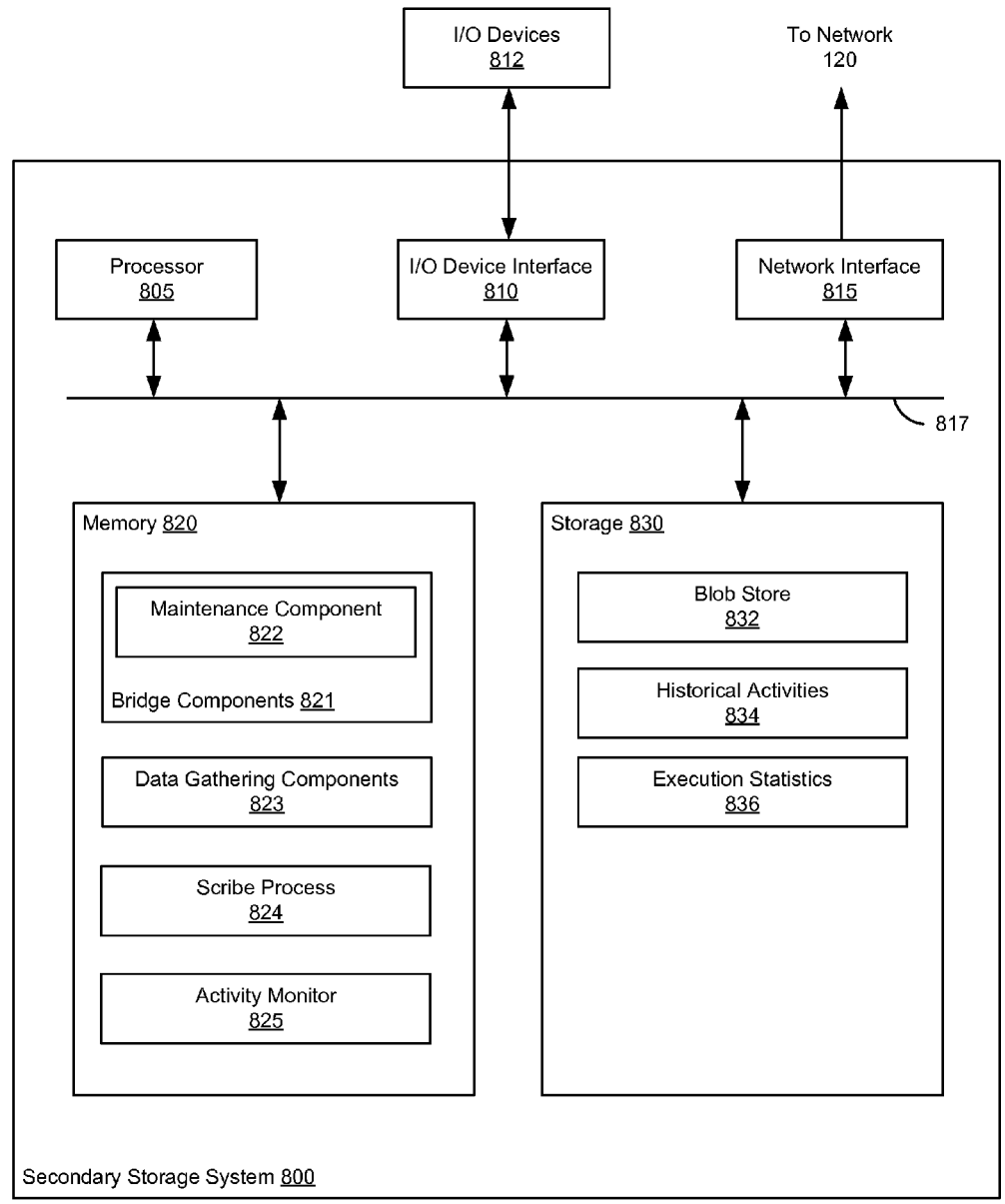
FIG. 8 illustrates an example secondary storage system configured to adaptively schedule maintenance processes in a distributed file system, according to one embodiment.

FIG. 8 illustrates an example secondary storage system 800 configured to adaptively schedule maintenance processes in a distributed file system, according to one embodiment. As shown, secondary storage system 800 includes, without limitation, a central processing unit (CPU) 805, a network interface 815, a memory 820, and storage 830, each connected to a bus 817. System 800 may also include an I/O device interface 810 connecting I/O devices 812 (e.g., keyboard, display and mouse devices) to the secondary storage system 800. Further, in context of this disclosure, the computing elements shown in secondary storage system 800 may correspond to a physical computing system (e.g., a system in a data center) or may be a virtual computing instance executing within a computing cloud.

CPU 805 retrieves and executes programming instructions stored in memory 820 as well as stores and retrieves application data residing in the storage 830. The bus 817 is used to transmit programming instructions and application data between CPU 805, I/O devices interface 810, storage 830, network interface 815, and memory 820. Note, CPU 805 is included to be representative of a single CPU, multiple CPUs, a single CPU having multiple processing cores, and the like. Memory 820 is generally included to be representative of a random access memory. Storage 830 may be a disk drive storage device. Although shown as a single unit, storage 830 may be a combination of fixed and/or removable storage devices, such as fixed disc drives, removable memory cards, or optical storage, network attached storage (NAS), or a storage area-network (SAN).

Illustratively, memory 820 includes bridge components 821, data gathering components 823, a scribe process 824, and an activity monitor 825. And storage 830 includes a blob store 832, historical activities 834, and execution statistics 836. The bridge components 821 provide a file system architecture for the distributed secondary storage system. The data gathering components 823 allow the secondary storage system 800 to communicate with primary storage servers and retrieve data from the primary storage servers.

In one embodiment, the scribe process 824 maintains information about the chunks of data in the blob store 832 in key-value stores (e.g., tree structures). One example key-value store may map blob structures to brick sections. Another store may map bricks to chunks.

In one embodiment, the bridge components 821 include a maintenance component 822. The maintenance component 822 includes one or more self-maintenance processes that ensure that the file system remains consistent, e.g., by correcting inconsistencies or updating file system structures after a given process is performed.

In one embodiment, the maintenance component 822 may include sub-components, such as a load predictor and a maintenance process scheduler, that perform machine learning algorithms to adaptively schedule self-maintenance processes to execute during operation of the secondary storage server 800. The load predictor may evaluate a current state of the file system. Doing so allows the load predictor to estimate a resource load required for each of the self-maintenance processes to perform. Further, the maintenance process scheduler evaluates a variety of inputs, including the estimated resource load, historical activities 834, current system activities, and external events to estimate a resource availability of the secondary storage system 800 at given time periods. The maintenance process scheduler then determines which of the self-maintenance processes to execute during the time periods.

In one embodiment, the maintenance component 822 may further tune the load predictor and maintenance process scheduler based on the execution statistics 836. Both the load predictor and the maintenance process scheduler can reinforce or recalibrate machine learning algorithms and input parameters used to estimate resource load and resource availability. Doing so provides for more accurate prediction of resource load and availability.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   estimating, based on a current state of a distributed storage system comprising a primary storage server and a plurality of secondary storage servers, an amount of computing resources of the primary storage server and the plurality of secondary storage servers required to perform each of a plurality of self-maintenance processes wherein the plurality of secondary storage servers are configured to perform one or more backup processes and the plurality of self-maintenance processes, wherein the plurality of self-maintenance processes include at least one of garbage collection and correcting inconsistencies associated with the distributed file system, wherein the plurality of secondary storage servers form a distributed file system providing backup storage services to the primary storage server;
   estimating, based on one or more inputs, an amount of computing resources of the primary storage server and the plurality of secondary storage servers available to perform one or more of the plurality of self-maintenance processes during at least a first time period of a plurality of time periods;
   determining which of the plurality of self-maintenance processes to perform during the at least first time period based on the estimated amount of computing resources of the primary storage server and the plurality of secondary storage servers required to perform each of the plurality of self-maintenance processes and the estimated amount of computing resources of the primary storage server and the plurality of secondary storage servers available to perform one or more of the plurality of self-maintenance processes wherein one or more of the self-maintenance processes are determined to be performed during the at least first time period; and
   scheduling, based on the estimated amount of computing resources required and on the estimated amount of computing resources available, the determined one or more self-maintenance processes to perform during the first time period.

2. The method of claim 1, wherein the one or more inputs includes at least one of a plurality of current activities of the primary storage server and the plurality of secondary storage servers, the current state of the primary storage server and the state of the plurality of secondary storage servers, a plurality of external events, and the estimated amount of computing resources of the primary storage server and the plurality of secondary storage servers required to perform each of the self-maintenance processes.

3. The method of claim 1, further comprising:
   performing each of the scheduled self-maintenance processes during the first time period; and
   collecting execution statistics of the performance of each of the scheduled self-maintenance processes.

4. The method of claim 3, wherein the amount of computing resources of the primary storage server and the plurality of secondary storage servers required and the amount of computing resources of the primary storage server and the plurality of secondary storage servers available are further estimated based on the execution statistics.

5. The method of claim 4, further comprising:
   upon determining that the estimated amount of computing resources available is within a specified range of an actual amount of computing resources available based on the execution statistics, reinforcing the one or more inputs using a machine learning algorithm; and
   upon determining that the estimated amount of computing resources available is not within the specified range of the actual amount of computing resources available based on the execution statistics, readjusting the one or more inputs using the machine learning algorithm.

6. The method of claim 1, wherein the amount of computing resources required and amount of computing resources available include at least one of an amount of I/O resources, network resources, storage capacity, and processing resources.

7. A non-transitory computer-readable storage medium having instructions, which, when executed on a processor, perform an operation comprising:
  estimating, based on a current state of a distributed storage system comprising a primary storage server and a plurality of secondary storage servers, an amount of computing resources of the primary storage server and the plurality of secondary storage servers required to perform each of a plurality of self-maintenance processes wherein the plurality of secondary storage servers are configured to perform one or more backup processes and the plurality of self-maintenance processes, wherein the plurality of self-maintenance processes include at least one of garbage collection and correcting inconsistencies associated with the distributed file system, wherein the plurality of secondary storage servers form a distributed file system providing backup storage services to the primary storage server;
  estimating, based on one or more inputs, an amount of computing resources of the primary storage server and the plurality of secondary storage servers available to perform one or more of the plurality of self-maintenance processes during at least a first time period of a plurality of time periods;
  determining which of the plurality of self-maintenance processes to perform during the at least first time period based on the estimated amount of computing resources of the primary storage server and the plurality of secondary storage servers required to perform each of the plurality of self-maintenance processes and the estimated amount of computing resources of the primary storage server and the plurality of secondary storage servers available to perform one or more of the plurality of self-maintenance processes, wherein one or more of the self-maintenance processes are determined to be performed during the at least first time period; and
  scheduling, based on the estimated amount of computing resources required and on the estimated amount of computing resources available, the determined one or more self-maintenance processes to perform during the first time period.

8. The computer-readable storage medium of claim 7, wherein the one or more inputs includes at least one of a plurality of current activities of the primary storage server and the plurality of secondary storage servers, the current state of the primary storage server and the state of the plurality of secondary storage servers, a plurality of external events, and the estimated amount of computing resources of the primary storage server and the plurality of secondary storage servers required to perform each of the self-maintenance processes.

9. The computer-readable storage medium of claim 7, wherein the operation further comprises:
  performing each of the scheduled self-maintenance processes during the first time period; and
  collecting execution statistics of the performance of each of the scheduled self-maintenance processes.

10. The computer-readable storage medium of claim 9, wherein the amount of computing resources of the primary storage server and the plurality of secondary storage servers required and the amount of computing resources of the primary storage server and the plurality of secondary storage servers available are further estimated based on the execution statistics.

11. The computer-readable storage medium of claim 10, the operation further comprising:
  upon determining that the estimated amount of computing resources available is within a specified range of an actual amount of computing resources available based on the execution statistics, reinforcing the one or more inputs using a machine learning algorithm; and
  upon determining that the estimated amount of computing resources available is not within the specified range of the actual amount of computing resources available based on the execution statistics, readjusting the one or more inputs using the machine learning algorithm.

12. The computer-readable storage medium of claim 7, wherein
  the amount of computing resources required and amount of computing resources available include at least one of an amount of I/O resources, network resources, storage capacity, and processing resources.

13. A system, comprising:
  a processor; and
  a memory containing program code, which, when executed on the processor, performs an operation comprising:
    estimating, based on a current state of a distributed storage system comprising a primary storage server and a plurality of secondary storage servers, an amount of computing resources of the primary storage server and the plurality of secondary storage servers required to perform each of a plurality of self-maintenance processes wherein the plurality of secondary storage servers are configured to perform one or more backup processes and the plurality of self-maintenance processes, wherein the plurality of self-maintenance processes include at least one of garbage collection and correcting inconsistencies associated with the distributed file system, wherein the plurality of secondary storage servers form a distributed file system providing backup storage services to the primary storage server;
    estimating, based on one or more inputs, an amount of computing resources of the primary storage server and the plurality of secondary storage servers available to perform one or more of the plurality of self-maintenance processes during at least a first time period of a plurality of time periods;
    determine which of the plurality of self-maintenance processes to perform during the at least first time period based on the estimated amount of computing resources of the primary storage server and the plurality of secondary storage servers required to perform each of the plurality of self-maintenance processes and the estimated amount of computing resources of the primary storage server and the plurality of secondary storage servers available to perform one or more of the plurality of self-maintenance processes, wherein one or more of the self-maintenance processes are determined to be performed during the at least first time period; and
    scheduling, based on the estimated amount of computing resources required and on the estimated amount of computing resources available, the determined one or more self-maintenance processes to perform during the first time period.

14. The system of claim 13, wherein the one or more inputs includes at least one of a plurality of current activities of the primary storage server and the plurality of secondary storage servers, the current state of the primary storage server and the state of the plurality of secondary storage servers, a plurality of external events, and the estimated amount of computing resources of the primary storage server and the plurality of secondary storage servers required to perform each of the self-maintenance processes.

15. The system of claim 13, wherein the operation further comprises:
- performing each of the scheduled self-maintenance processes during the first time period; and
- collecting execution statistics of the performance of each of the scheduled self-maintenance processes.

16. The system of claim 15, wherein the amount of computing resources of the primary storage server and the plurality of secondary storage servers required and the amount of computing resources of the primary storage server and the plurality of secondary storage servers available are further estimated based on the execution statistics.

17. The system of claim 16, the operation further comprising:
- upon determining that the estimated amount of computing resources available is within a specified range of an actual amount of computing resources available based on the execution statistics, reinforcing the one or more inputs using a machine learning algorithm; and
- upon determining that the estimated amount of computing resources available is not within the specified range of the actual amount of computing resources available based on the execution statistics, readjusting the one or more inputs using the machine learning algorithm.

18. The system of claim 13, wherein the amount of computing resources required and amount of computing resources available include at least one of an amount of I/O resources, network resources, storage capacity, and processing resources.

* * * * *